United States Patent
Justice et al.

(10) Patent No.: US 10,549,720 B2
(45) Date of Patent: Feb. 4, 2020

(54) RECOVERY SYSTEM WITH REPEATING COMMUNICATION CAPABILITIES

(71) Applicant: CalAmp Wireless Networks Corporation, Irvine, CA (US)

(72) Inventors: James A. Justice, Bellingham, MA (US); George Liu, Stoughton, MA (US); Ira Cohen, Brookline, MA (US)

(73) Assignee: CalAmp Wireless Networks Corporation, Irvine, CA (US)

( * ) Notice: Subject to any disclaimer, the term of this patent is extended or adjusted under 35 U.S.C. 154(b) by 0 days.

(21) Appl. No.: 16/410,929

(22) Filed: May 13, 2019

(65) Prior Publication Data

US 2019/0263354 A1 Aug. 29, 2019

Related U.S. Application Data

(60) Division of application No. 15/422,104, filed on Feb. 1, 2017, now Pat. No. 10,286,874, which is a continuation of application No. 14/333,918, filed on Jul. 17, 2014, now Pat. No. 9,592,794, which is a continuation of application No. 11/229,736, filed on Sep. 19, 2005, now Pat. No. 8,787,823.

(51) Int. Cl.
*B60R 25/102* (2013.01)
*G01S 5/02* (2010.01)
*B60R 25/33* (2013.01)
*G07C 5/00* (2006.01)

(52) U.S. Cl.
CPC ............ *B60R 25/102* (2013.01); *B60R 25/33* (2013.01); *G01S 5/02* (2013.01); *G07C 5/008* (2013.01)

(58) Field of Classification Search
CPC .................................................. B60R 25/102
See application file for complete search history.

(56) References Cited

U.S. PATENT DOCUMENTS

| | | | | |
|---|---|---|---|---|
| 4,177,466 A | * | 12/1979 | Reagan | G01S 13/74 340/426.16 |
| 4,818,988 A | * | 4/1989 | Cooperman | H04Q 3/521 327/404 |
| 4,908,609 A | * | 3/1990 | Stroomer | G02F 1/133514 345/589 |
| 4,978,946 A | * | 12/1990 | Nordholm | G08B 13/02 340/309.16 |
| 5,631,642 A | * | 5/1997 | Brockelsby | B60R 25/102 340/426.16 |
| 5,704,008 A | * | 12/1997 | Duvall, Jr. | B60R 25/04 704/273 |
| 5,895,436 A | * | 4/1999 | Savoie | B60R 25/102 342/44 |
| 5,917,423 A | * | 6/1999 | Duvall | B60R 25/00 340/10.1 |

(Continued)

*Primary Examiner* — Ankur Jain
(74) *Attorney, Agent, or Firm* — KPPB LLP

(57) ABSTRACT

A recovery system and method with repeating communication functionality includes a station configured to send a first message and at least a first remote transmitting unit responsive to the central station and configured to transmit a second message to a locating unit. At least a second remote transmitting unit includes a receiver which receives the second message, a controller configured to process the second message, and a transmitter for transmitting a third message to the locating unit.

11 Claims, 5 Drawing Sheets

(56) References Cited

U.S. PATENT DOCUMENTS

| | | | | |
|---|---|---|---|---|
| 6,229,988 B1* | 5/2001 | Stapefeld | H04B 1/1615 | 340/7.35 |
| 6,266,536 B1* | 7/2001 | Janky | H04B 7/2625 | 455/502 |
| 6,522,698 B1* | 2/2003 | Irving | G01S 1/045 | 375/272 |
| 6,534,786 B2* | 3/2003 | Miyajima | H01L 22/34 | 257/48 |
| 6,665,613 B2* | 12/2003 | Duvall | B60R 25/1012 | 701/485 |
| 6,847,825 B1* | 1/2005 | Duvall | G01S 5/0027 | 342/357.55 |
| 6,876,858 B1* | 4/2005 | Duvall | B60R 25/102 | 340/426.19 |
| 7,016,211 B2* | 3/2006 | Park | G11C 7/18 | 365/149 |
| 2001/0019315 A1* | 9/2001 | Boulay | B60R 25/1018 | 342/357.31 |
| 2001/0034233 A1* | 10/2001 | Tiedemann, Jr. | H04W 36/30 | 455/436 |
| 2002/0090955 A1* | 7/2002 | Nelson | B60R 25/102 | 455/456.6 |
| 2003/0206117 A1* | 11/2003 | Rosenberg | G06Q 20/0652 | 340/932.2 |
| 2003/0222813 A1* | 12/2003 | Boulay | B60R 25/00 | 342/159 |
| 2004/0004088 A1* | 1/2004 | Yerby | B65D 83/38 | 222/145.5 |
| 2004/0006426 A1* | 1/2004 | Armstrong | G01S 5/0072 | 701/468 |
| 2004/0019513 A1* | 1/2004 | Colalancia | G06Q 10/02 | 705/7.15 |
| 2004/0130440 A1* | 7/2004 | Boulay | B60R 25/00 | 340/426.1 |
| 2004/0198309 A1* | 10/2004 | Duvall | B60R 25/102 | 455/404.1 |
| 2004/0233068 A1* | 11/2004 | Duvall | G08G 1/205 | 340/988 |
| 2007/0040668 A1* | 2/2007 | Krishna | B60R 25/1004 | 340/506 |
| 2007/0066218 A1* | 3/2007 | Justice | B60R 25/102 | 455/7 |
| 2007/0066219 A1* | 3/2007 | Liu | B60R 25/102 | 455/7 |
| 2008/0051086 A2* | 2/2008 | Etemad | H04W 36/0072 | 455/436 |

* cited by examiner

RECOVERY SYSTEM WITH REPEATING COMMUNICATION CAPABILITIES

CROSS-REFERENCE TO RELATED APPLICATIONS

This application is a divisional of U.S. patent application Ser. No. 15/422,104, filed Feb. 1, 2017, which is a continuation of U.S. patent application Ser. No. 14/333,918, filed Jul. 17, 2014 and issued as U.S. Pat. No. 9,592,794, which is a continuation of U.S. patent application Ser. No. 11/229,736, filed Sep. 19, 2005 and issued as U.S. Pat. No. 8,787,823, the disclosures of which are hereby incorporated by reference in their entirety.

FIELD OF THE INVENTION

This invention relates primarily to stolen vehicle recovery systems but also relates to other types of recovery and communicating systems.

BACKGROUND OF THE INVENTION

The applicant's successful and popular vehicle recovery system sold under the trademark LoJack® includes a small electronic vehicle locating unit (VLU) with a transponder hidden within a vehicle, a private network of communication towers each with a remote transmitting unit (RTU), one or more law enforcement vehicles equipped with a vehicle tracking unit (VTU), and a network center with a database of customers who have purchased a VLU. The network center interfaces with the National Crime Information Center. The entries of that database include the VIN number of the customer's vehicle and an identification code assigned to the customer's VLU.

When a LoJack® product customer reports that her vehicle has been stolen, the VIN number of the vehicle is reported to a law enforcement center for entry into a database of stolen vehicles. The network center includes software that interfaces with the database of the law enforcement center to compare the VIN number of the stolen vehicle with the database of the network center that includes VIN numbers corresponding to VLU identification codes. When there is a match between a VIN number of a stolen vehicle and a VLU identification code, as would be the case when the stolen vehicle is equipped with a VLU, and when the center has acknowledged the vehicle has been stolen, the network center communicates with some of the RTUs of the various communication towers (currently there are 130 nationwide) and each tower transmits a message to activate the transponder of the particular VLU bearing the identification code.

The transponder of the VLU in the stolen vehicle is thus activated and begins transmitting the unique VLU identification code. The VTU of any law enforcement vehicles proximate the stolen vehicle receive this VLU transponder code and, based on signal strength and directional information, the appropriate law enforcement vehicle can take active steps to recover the stolen vehicle. See, for example, U.S. Pat. Nos. 4,177,466; 4,818,988; 4,908,609; 5,704,008; 5,917,423; 6,229,988; 6,522,698; and 6,665,613, all incorporated herein by this reference in their entirety.

Typically, there are two telephone lines interconnecting each RTU to the center. If a stolen vehicle is suspected of being located in the eastern United States where there are 21 towers each with an RTU, 21 telephone calls would be made so that each RTU begins to transmit a message which, if received by the VLU in the stolen vehicle, activates the VLU transponder so law enforcement personnel can then locate the stolen vehicle using a VTU.

Calling each RTU therefore takes time wherein a thief can attempt to thwart recovery efforts. Calling each RTU also incurs costs. Finally, in the case where there is a problem with an RTU land line connection with the center, that RTU win not begin transmitting the message required to activate the VLU in the stolen vehicle.

SUMMARY OF THE INVENTION

It is therefore an object of this invention to provide a recovery system in which the time required to activate a VLU in a stolen vehicle is reduced.

It is a further object of this invention to provide such a system that is less costly.

It is a further object of this invention to provide such a system that is more reliable.

The subject invention results from the realization that a faster, less costly, and more reliable vehicle recovery system is accomplished not by the center calling each RTU but instead by the center calling one or only a few designated RTUs and the other RTUs being programmed to listen for messages transmitted by the called RTUs so the non-called RTUs can then send the appropriate message to the VLU in a stolen vehicle.

The subject invention, however, in other embodiments, need not achieve all these objectives and the claims hereof should not be limited to structures or methods capable of achieving these objectives.

The subject invention is directed to a recovery system with repeating communication capabilities featuring a station configured to send a first message and at least a first remote transmitting unit responsive to the central station and configured to transmit a second message to a locating unit. There is at least a second remote transmitting unit including a receiver which receives said second message, a controller configured to process said second message, and a transmitter for transmitting a third message to the locating unit.

In one example, the first remote transmitting unit includes a land line connection to the station for receiving the first message and an RF transmitter for sending the second message both to the locating unit and to the receiver of the second remote transmitting unit Typically, the first message, the second message, and the third message are repeated and include the same basic information: a locating unit identifier and a code which causes the transponder of the locating unit to begin or cease transmission or to adjust the transmission schedule.

The controller may be programmed to transmit the third message only upon receipt of two or more instances of the second message, to transmit the third message only for a predetermined time period, and to ignore a second message received by the receiver below a predetermined signal strength.

There may be M first type remote transmitting units and N second type remote transmitting units each including: a receiver that receives the second message, a controller that processes the second message, and a transmitter that transmits the third message. Preferably, M is less than N.

One system includes a station that sends a first message to a plurality of remote transmitting units that, in turn, transmit a second message to a locating unit. This invention features selected ("called") remote transmitting units connected to the station via at least one landline for receipt of the first message. Those remote transmitting units include a wireless transmitter for transmitting a second message to the locating unit. Selected ("non-called") remote transmitting units include a receiver for receiving the second message, and a controller configured to process the second message and to transmit a third message to the locating unit.

One system with repeating communication capabilities in accordance with this invention includes a station configured to send a first message and at least a first remote transmitting unit connected to the central station via a first data link and configured to transmit a second message to a locating unit via a second data link. At least a second remote transmitting unit includes a receiver which receives the second message via the second data link, a controller configured to process the second message, and a transmitter for transmitting a third message to the locating unit via the second data link. In the preferred embodiment, the first data link is a landline and the second data link is wireless.

A recovery method in accordance with this invention includes transmitting a first message to at least a first remote transmitting unit, the first remote transmitting unit transmitting a second message to a locating unit in response to the first message, and a second remote transmitting unit receiving the second message from the first remote transmitting unit and, in response, transmitting a third message to the locating unit. In one example, the first remote transmitting unit includes a landline connection to a station for receiving the first message and an RF transmitter for sending the second message to the locating unit and to a receiver of the second remote transmitting unit. Typically, the first message, the second message, and the third message include the same basic information. The second remote transmitting unit may transmit the third message only upon receipt of two or more instances of the second message, transmit the third message only for a predetermined time period, and/or ignore a second message below a predetermined signal strength.

Yet another embodiment of the invention includes a recovery system for providing an activation message to a vehicle location unit associated with a vehicle, the system including a vehicle location unit disposed in a vehicle, a central station configured to transmit a first activation message meant for the vehicle location unit, at least a first remote transmitting unit including a first receiving unit for receiving the first activation message meant for the vehicle location unit, a controller for processing the first activation message, and a transmitter configured to transmit a second activation message, using the processed first activation message, meant for the vehicle location unit, at least a second remote transmitting unit including a second receiving unit for receiving the second activation message meant for the vehicle location unit, a controller configured to process said second message, and a transmitter configured to transmit a third activation message, using the processed second activation message, to the vehicle location unit.

In yet another additional embodiment of the invention, the first remote transmitting unit includes a landline connection to the central station for receiving the first activation message.

In still another additional embodiment of the invention, the first activation message, the second activation message, and the third activation message include the same information.

In yet still another additional embodiment of the invention, the controller of the second remote transmitting unit is programmed to transmit the third activation message only upon receipt of two or more instances of the second activation message.

In yet another embodiment of the invention, the controller of the second remote transmitting unit is programmed to transmit the third activation message only for a predetermined time period.

In still another embodiment of the invention, the controller of the second remote transmitting unit is programmed to ignore a second activation message below a predetermined signal strength.

In yet still another embodiment of the invention, there are N second remote transmitting units each including: a receiver which receives the second activation message, a controller which processes the second activation message, and a transmitter which transmits the third activation message.

In yet another additional embodiment of the invention, the first activation message includes a first code representing a vehicle location unit identifier and a second code which activates the vehicle location unit to transmit a signal.

In still another additional embodiment of the invention, the first remote transmitting unit is configured to repeat the transmission of the second activation message which includes the first and second codes.

In yet still another additional embodiment of the invention, the second remote transmitting unit is configured to repeat the transmission of the third activation message which includes the first and second codes.

In yet another embodiment of the invention, the first activation message includes a first code representing a vehicle location unit identifier and a third code which adjusts the transmission schedule of the vehicle location unit.

In still another embodiment of the invention, the first activation message includes a first code representing a vehicle location unit identifier and fourth code which deactivates the vehicle location unit.

Still another embodiment of the invention includes a recovery method including transmitting a first activation message to a vehicle location unit and to a first remote transmitting unit, the first activation message including a first code representing a vehicle location unit identifier, receiving the first activation message at the first remote transmitting unit but not at the vehicle locating unit, processing the first activation message to generate a second activation message, transmitting the second activation message to the vehicle location unit and to a second remote transmitting unit, the second activation message including the first code representing a vehicle location unit identifier, receiving the second activation message at a second remote transmitting unit but not at the vehicle locating unit, processing the second activation message to generate a third activation message, and transmitting the third activation message to the vehicle location unit and to a third remote transmitting unit, the third activation message including the first code representing a vehicle location unit identifier.

In yet another additional embodiment of the invention, the first remote transmitting unit includes a landline connection to a station for receiving the first message.

In still another additional embodiment of the invention, the first remote transmitting unit includes an RF transmitter for sending the second activation message to the vehicle location unit and to a receiver of the second remote transmitting unit.

In yet still another additional embodiment of the invention, the first activation message, the second activation message, and the third activation message include the same information.

In yet another embodiment of the invention, the second remote transmitting unit transmits the third activation message only upon receipt of two or more instances of the second activation message.

In still another embodiment of the invention, the first activation message includes a second code which activates the vehicle location unit to transmit a signal and the second and third messages include the first and second codes.

In yet still another embodiment of the invention, the first remote transmitting unit repeats the transmission of the second activation message.

In yet another additional embodiment of the invention, the second remote transmitting unit repeats the transmission of the third activation message.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
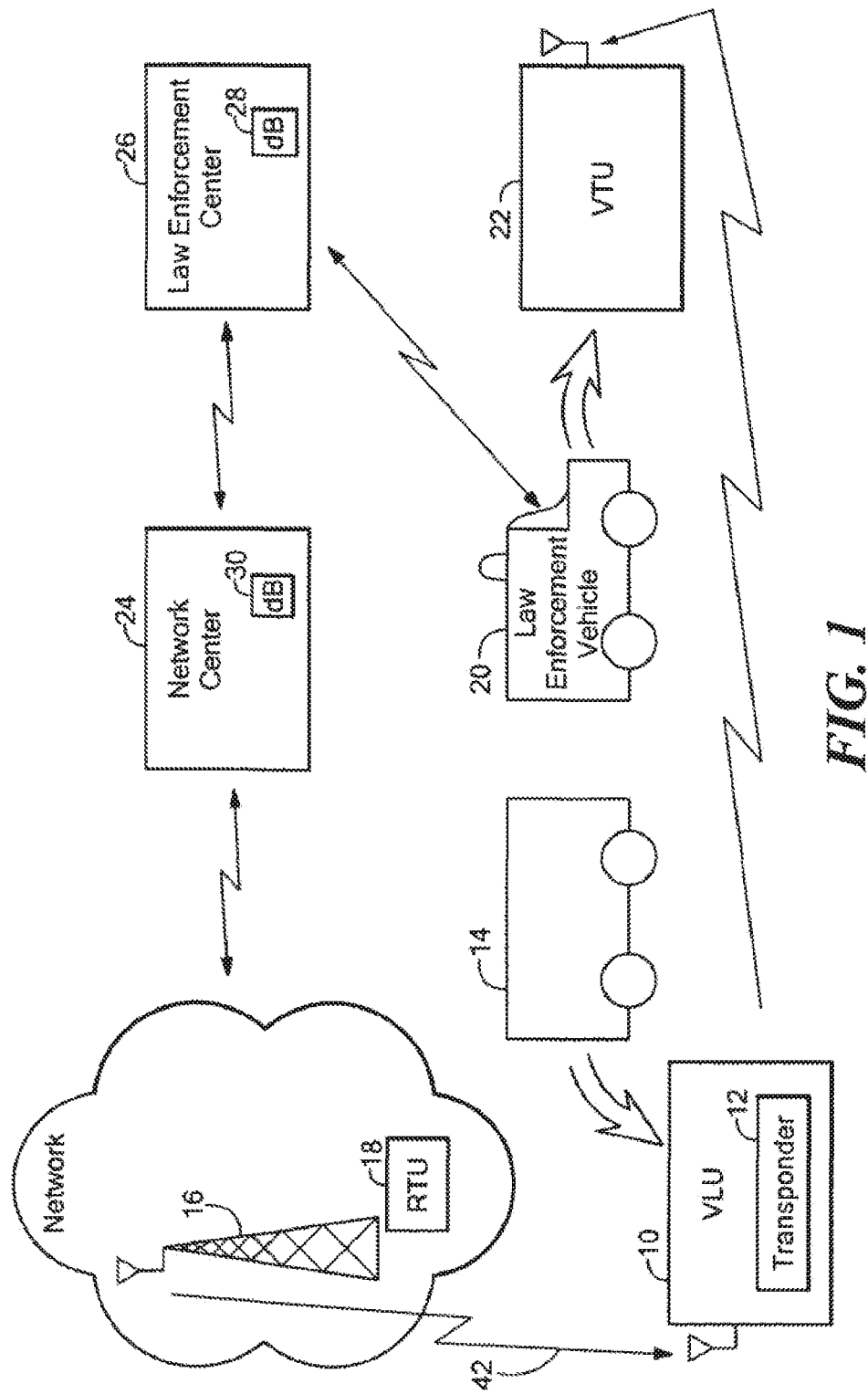
FIG. 1 is a schematic block diagram showing a typical vehicle recovery system in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the background section above, the applicant's successful and popular vehicle recovery system sold under the trademark LoJack® includes a small electronic vehicle locating unit (VLU) 10, FIG. 1 with a transponder 12 hidden within a vehicle 14, a private network of communication towers 16 each with a remote transmitting unit (RTU) 18, one or more law enforcement vehicles 20 equipped with a vehicle tracking unit (VTU) 22, and network center 24.

When a LoJack® product customer reports that her vehicle has been stolen, the VIN number of the vehicle is reported to law enforcement center 26 for entry into database 28 of stolen vehicles. Network center 24 includes software that interfaces with database 28 of law enforcement center 26 to compare the VIN number of the stolen vehicle with database 30 of network center 24 that includes VIN numbers corresponding to VLU identification codes. When there is a match between a VIN number of a stolen vehicle and a VLU identification code, as would be the case when stolen vehicle 14 is equipped with VLU 10, network center 24 communicates with the RTUs 18 of the various communication towers 16 and each tower then transmits a message to activate transponder 12 of VLU 10 bearing the particular identification code.

Transponder 12 of VLU 10 in stolen vehicle 14, once activated, begins transmitting a unique VLU identification code. VTU 22 of law enforcement vehicle 20 proximate stolen vehicle 14 receives this VLU transponder code and, based on signal strength and directional information, the appropriate law enforcement vehicle can take active steps to recover stolen vehicle 14.

Figure 2:
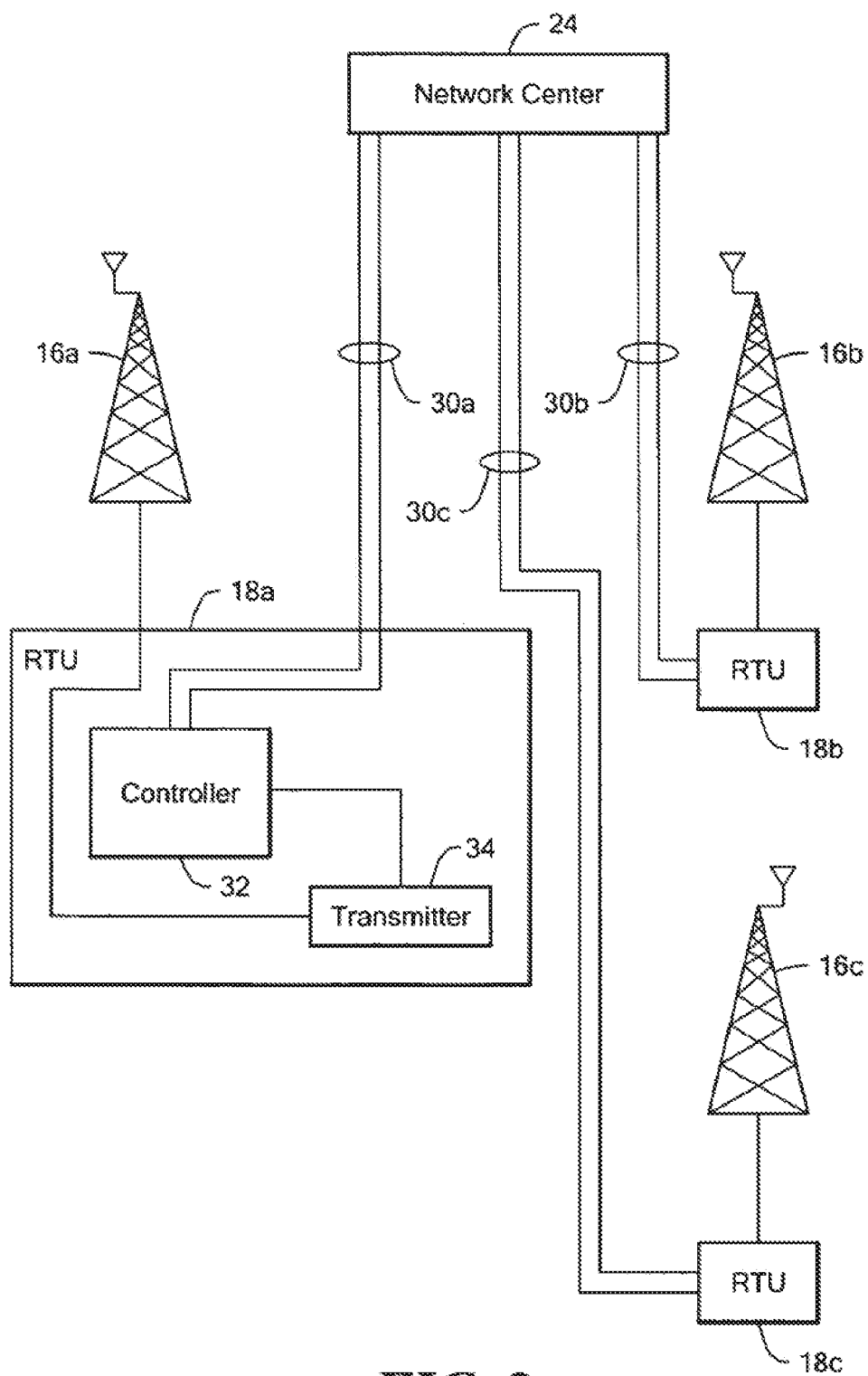
FIG. 2 is a schematic block diagram showing the primary components associated with a remote transmitting unit and tower combination in accordance with the applicant's own prior art.

As shown in FIG. 2, each remote transmitting unit (RTU) 18a, 18b, and 18c includes a landline connection or connections 30a-30c to center 24. Typically, there are two telephone lines between each RTU and the center for reliability purposes. When the controller 32 of RTU 18a receives a message from center 24 that a particular vehicle locating unit (VLU) is to be activated, controller 32 activates RF transmitter 34 to send the appropriate message wirelessly to the VLU as shown in FIG. 1. Each RTU 18b, 18c, and the like is configured the same (and includes other electronic circuitry and hardware such as a GPS receiver fix establishing a time reference—not shown for clarity) and thus each RTU is called by center 24 via a landline and begins transmitting an activation message wirelessly to the VLU. In response to this message, the VLU transponder is activated and law enforcement personnel, using a VTU, can track and locate the VLU-equipped vehicle or other object of value equipped with a VLU.

In the New England area, for example, there are 21 towers each with an RTU and so center 24 would make 21 telephone calls so that all 21 RTUs begin transmitting a transponder activation message to the VLU of a vehicle as delineated in the Background section above. This prior configuration and method can result in a delay during which a thief can attempt to thwart recovery efforts. Calling each RTU also incurs costs. Finally, in the case where there is a problem with an RTU's landline connection, that RTU will not begin transmitting the message required to activate the VLU.

Figure 3:
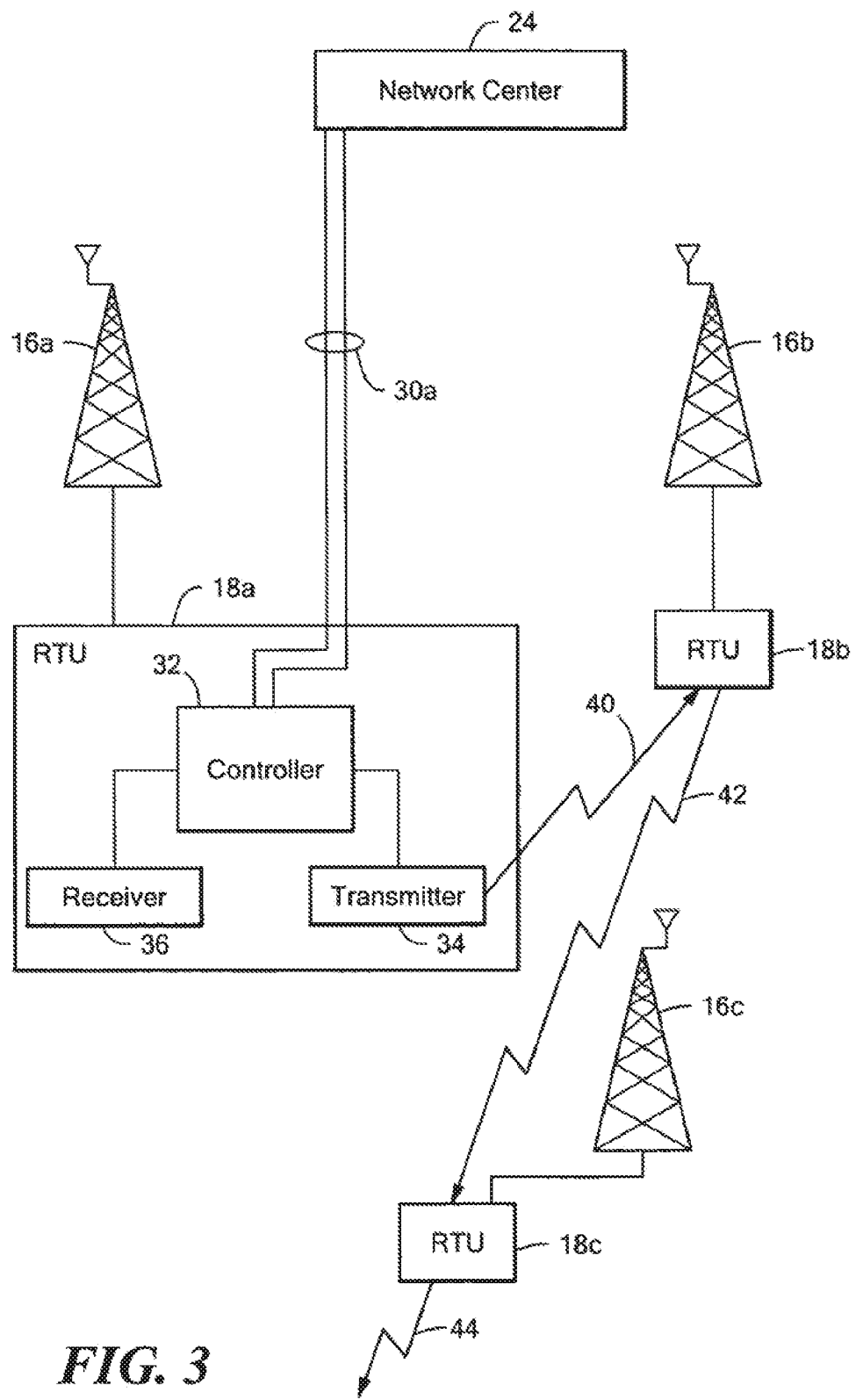
FIG. 3 is a schematic block diagram showing the primary components associated with a remote transmitting unit in accordance with the subject invention.

The subject invention results in a faster, less costly, and more reliable recovery system for vehicles and other objects of value. As shown in the example of FIG. 3, RTU 18a is still connected to center 24 via landline 30a. RTUs 18b and 18c may also be connected to center 24 by a landline (not shown) but such a connection is not necessary. Instead, each or select RTUs 18 now includes a RF receiver 36 in addition to RF transmitter 34 controlled by controller 32. The controller 32 of each RTU is programmed to listen, via its respective receiver, for messages transmitted by all other or select, designated, RTUs. In this way, for example, center 24 need only call RTU 18a that receives the message from center 24 via landline 30a. RTU 18a then begins to wirelessly transmit a message as shown at 40 to a particular VLU in order to activate that VLU's transponder. RTU 18b, in turn, also receives the message transmitted by RTU 18a. The controller of RTU 18b then processes that message and causes the transmitter of RTU 18b to transmit a message as shown at 42 that will also activate the transponder of the VLU. That message 42, in turn is received by the receiver of RTU 18c which, in response, also transmits a message that will activate the transponder of the VLU and possibly cause other RTUs, not shown, to begin transmitting messages to the VLU.

The end result of this configuration is the same as for the configuration of FIG. 2: all the RTUs transmit a message that will activate the transponder in a stolen vehicle equipped with a VLU. But, in the configuration of FIG. 2, all the RTUs had to be called by center 24 while, in contrast, in the configuration of FIG. 3 only one RTU had to be called by the center. The result is a time and cost savings and added reliability when, for example, there is a problem with the landline connection between a RTU and the center.

Figure 4:
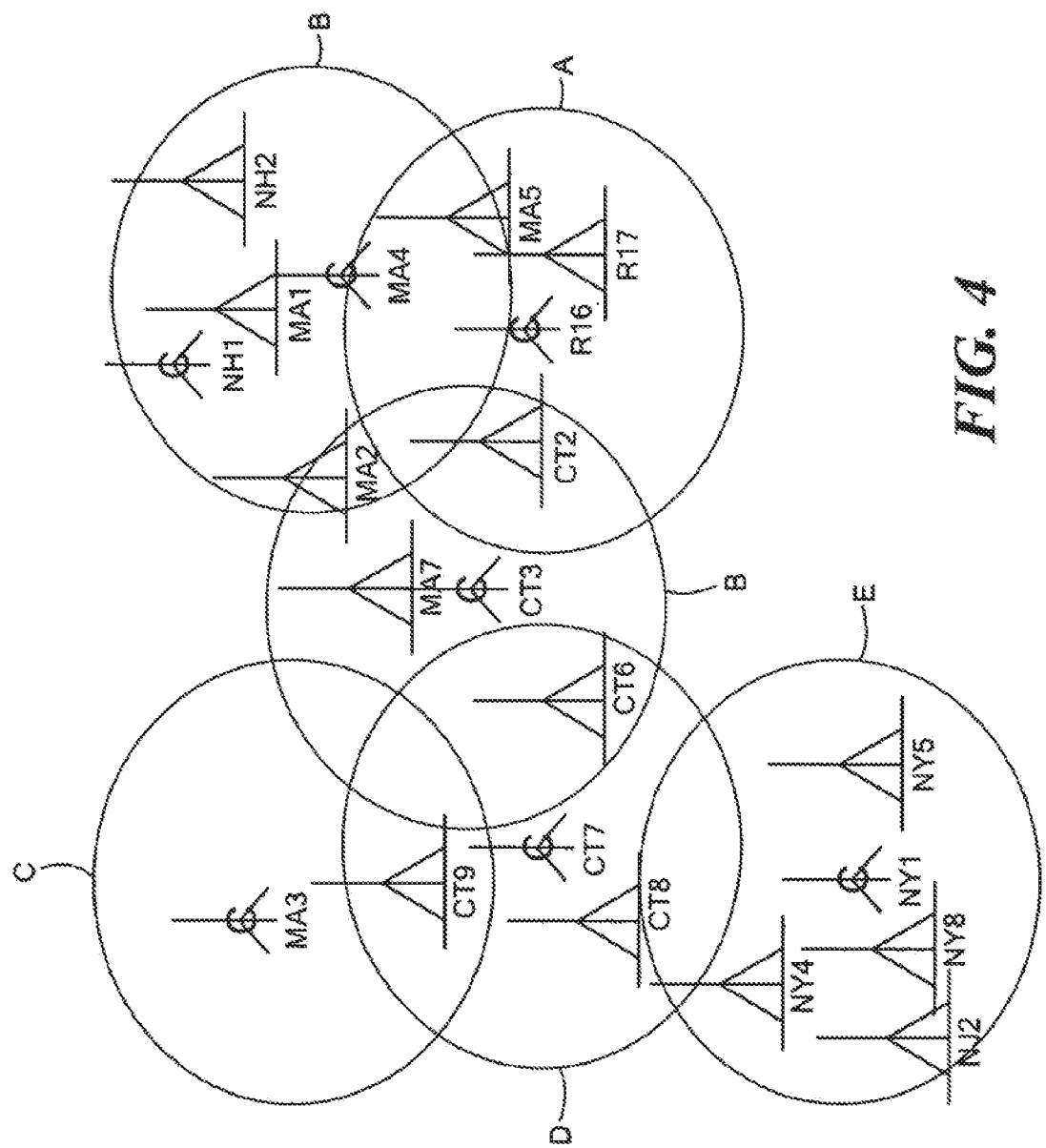
FIG. 4 is a schematic diagram showing an example of a recovery system and method with repeating communication capabilities in accordance with the subject invention.

In the example of FIG. 4, one eastern U.S. network includes 21 RTU/tower combinations as shown each labeled by state, given a number, and associated geographically by cells A-E. Cell A thus includes two tower/RTU combinations located in New Hampshire (NH1 and NH2) and three tower/RTU combinations located in Massachusetts (MA1, MA2, and MA4). A particular tower/RTU combination may be a part of two or more cells as shown. The tower/RTU combinations with a "C" designation are the "called" towers (they receive a message from the center via a landline); the tower/RTU combinations without a "C" designation, in contrast, receive that same message wirelessly from other proximate tower/RTU combinations as discussed with reference to FIG. 3. Note there are less called RTUs than non-called RTUs. These are examples only, however, as the designation of which tower/RTU combinations are called by the center and which receive their messages wirelessly from other tower/RTU combinations depends on many factors.

It is convenient to designate the messages sent from a station to a called tower/RTU combination the "first" message, and the message those called tower/RTU combinations transmit wirelessly to a VLU the "second" message. The first message can take different forms. When the first message is intended to activate the transponder of a VLU, it will include a code representing the identifier of the particular VLU and a code that initiates the VLU to activate its transponder to transmit a signal. A typical RTU controller is programmed to then generate the second message to include both of these codes and to repeat that transmission periodically for a predetermined time period. The non-called RTUs receive this second message wirelessly and transmit, periodically, for a predetermined time (e.g., one day), the same basic message deemed herein a "third" message. Therefore, the so-called first, second, and third messages may include the same basic information: the VLU identifier and a code that causes the transponder of the VLU to begin transmitting.

Messages other than the VLU transponder activation message include codes that adjust the transmission schedule of the VLU transponder or deactivate the VLU transponder. Other messages between the center and the called RTUs and between the called RTUs and the RTUs that receive information wirelessly are possible.

To ensure corrupted messages are not re-broadcast or propagated by the network, the controller of each non-called RTU is preferably programmed to transmit a message to a VLU only if that RTU receives, wirelessly, the same message twice from another called RTU after the expiration of a wait period (e.g., 60 seconds). Also, the controller of each non-called RTU is preferably programmed to ignore messages received that fall below a predetermined signal strength. The controller is typically implemented in a computer. The center "station" may include computers in more than one location although these are not necessary limitations of the subject invention.

In whatever configuration, this method of implementing a recovery system shortens the time required to activate the VLU in a stolen vehicle. The system and method of this invention whereby only one or select number of RTUs are called by the center via a landline results is less costly and more reliable. Instead of having the center call each RTU, select RTUs are programmed to listen for messages transmitted wirelessly by the called RTUs so these non-called RTUs can then send the appropriate message to a VLU.

Figure 5:
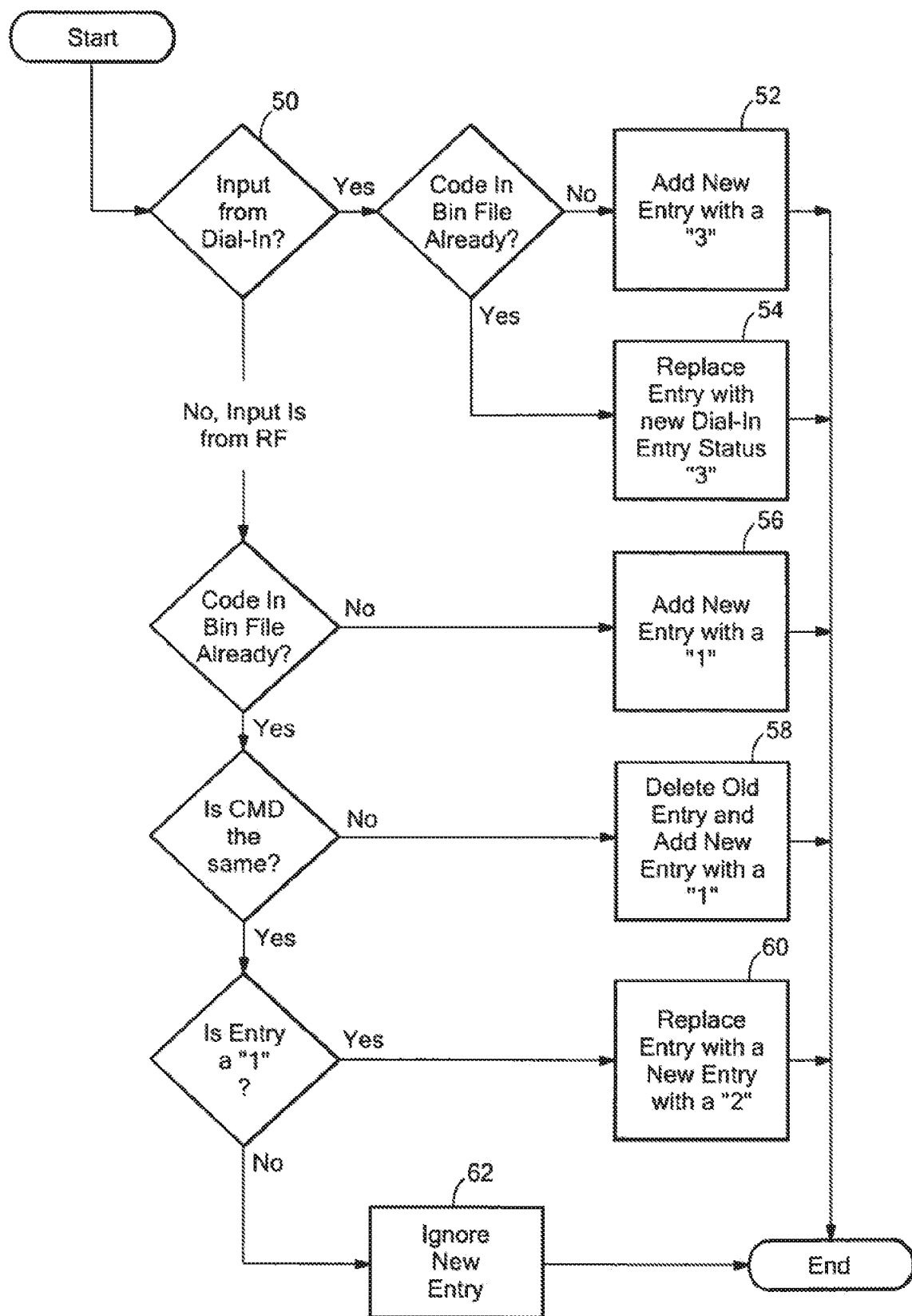
FIG. 5 is logic flow diagram for the programming of a remote transmitting unit in accordance with this invention.

FIG. 5 shows how, with a given input, the logic of the RTU controller changes the state of an existing entry, or adds a new entry to a list (table) of entries for transmission depending on the source of the input (dial-up or RF), step 50, the state of a saved entry, and whether there is a change in command for that entry.

In step 52, a new entry is dialed in. The new entry is added to the list of entries, and the state flag is set to "3". Step 54 shows an entry dialed in for an existing entry. The new dialed-in entry replaces the old entry whether or not the command is the same, and whether or not the previous input was RF or dial-in. For example, if there were an Activation entry for unit 1234567, and a De-activation command is dialed-in for the same unit, 1234567, the Activation entry would be replaced by the dialed-in De-Activation entry. The state flag is set to "3".

Step 56 shows an RF input when there is no previous input fur that code. The new code is added to the entry list. The state flag is set to "1" because it is the first entry for that code. Step 58 shows an RF input where the command (Activate or Deactivate) is different from the command in the entry list. If the command is different, the logic treats the input as a new entry, removes the old entry, and sets the state flag to "1".

Step 60 shows an RF input where there is an existing entry with a state flag of "1" and with the same command. The state flag is set to "2". This indicates that a second RF valid entry with the same command and the same code has been received. The system will transmit on the determined schedule if a unit has a state flag of "2" or "3".

Step 62 shows additional RF input for an entry that matches the same command and the same code. These entries are ignored, and the system continues to transmit on schedule. Maintaining very simple state information allows the system to automatically validate and transmit on schedule messages from either RF or dial-in sources.

The "sunset rule" referred to above, implemented by the RTU controller, limits the adverse effects of repeating transmissions based on RF input. In one specific implementation, at midnight GPS time (about sunset Eastern U.S. time) the state flag is changed for every entry in the BIN file. If the state=3 (Dial-up input), then keep the state the same. If the state=1 (1 RF input, do not transmit), then the entry is discarded. If the state=2 (2 RF inputs, transmit on schedule), then the state is changed to 1.

The effect of these state changes is that garbage is discarded, and a fresh input from a dial-up source is required for the transmissions to continue after sunset, which is the next day GPS time. This rule limits the time that an RTU listens for the second RF input by discarding any single inputs at sunset. This rule also prevents garbage from transmitting when two identical garbage messages have been heard. It removes any old activation transmissions, in case a tower did not hear the de-activation signal. The sunset rule keeps the state of the RF repeated messages healthy.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims. For example, the system and method described herein may prove useful in other networks and for in systems other than the recovery of valuable objects such as vehicles.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A recovery system for providing an activation message to a vehicle location unit associated with a vehicle, the system comprising: a vehicle location unit disposed in a vehicle; a central station configured to transmit a first activation message meant for the vehicle location unit; at least a first remote transmitting unit including: a first receiving unit for receiving the first activation message meant for the vehicle location unit; a controller for processing the first activation message; and a transmitter configured to transmit a second activation message using the processed first activation message, meant for the vehicle location unit; at least a second remote transmitting unit including: a second receiving unit for receiving the second activation message meant for the vehicle location unit; a controller configured to process said second message; a transmitter configured to transmit a third activation message, using the processed second activation message, to the vehicle location unit; and in which the first activation message includes a first code representing a vehicle location unit identifier and a second code which activates the vehicle location unit to transmit a signal.

2. The system of claim 1 in which the first remote transmitting unit includes a landline connection to the central station for receiving the first activation message.

3. The system of claim 1 in which the first activation message, the second activation message, and the third activation message include the same information.

4. The system of claim 1 in which the controller of the second remote transmitting unit is programmed to transmit the third activation message only upon receipt of two or more instances of the second activation message.

5. The system of claim 1 in which the controller of the second remote transmitting unit is programmed to transmit the third activation message only for a predetermined time period.

6. The system of claim 1 in which the controller of the second remote transmitting unit is programmed to ignore a second activation message below a predetermined signal strength.

7. The system of claim 1 in which there are N second remote transmitting units each including: a receiver which receives the second activation message, a controller which processes the second activation message, and a transmitter which transmits the third activation message.

8. The system of claim 1 in which the first remote transmitting unit is configured to repeat the transmission of the second activation message which includes the first and second codes.

9. The system of claim 8 in which the second remote transmitting unit is configured to repeat the transmission of the third activation message which includes the first and second codes.

10. The system of claim 1 in which the first activation message includes a first code representing a vehicle location unit identifier and a third code which adjusts the transmission schedule of the vehicle location unit.

11. The system of claim 1 in which the first activation message includes a first code representing a vehicle location unit identifier and fourth code which deactivates the vehicle location unit.

\* \* \* \* \*